Figure 1:
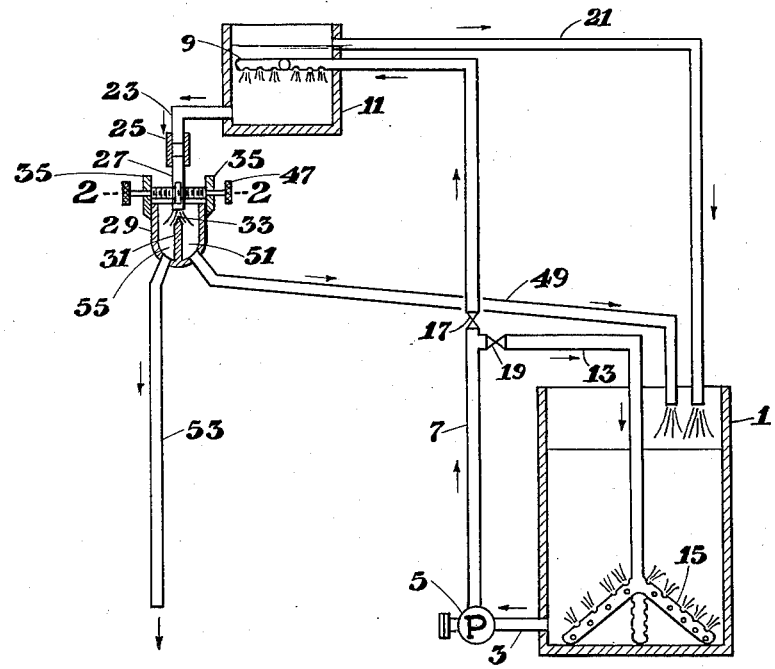
Figure 2:
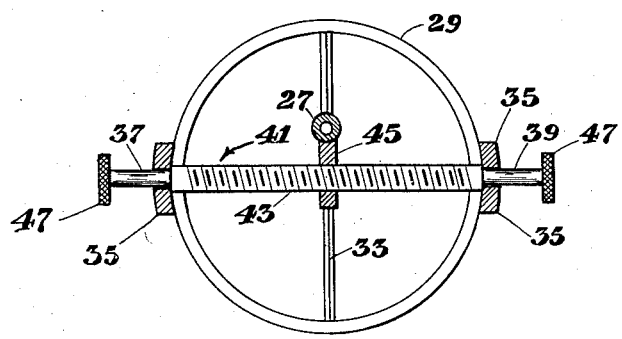

Jan. 15, 1952     C. F. TERRELL, JR     2,582,802

LIQUID FEEDING APPARATUS

Filed Oct. 19, 1945

INVENTOR.
Charles F. Terrell, Jr.
BY
Edward H. Lang
ATTORNEY

UNITED STATES PATENT OFFICE 2,582,802

LIQUID FEEDING APPARATUS

Charles F. Terrell, Jr., Newark, Ohio, assignor to The Pure Oil Company, Chicago, Ill., a corporation of Ohio Application October 19, 1945, Serial No. 623,230

1 Claim. (Cl. 137—78)

This invention relates to apparatus for feeding regulated amounts of liquid and to a proportioning device for enabling any desired quantity of liquid to be fed to a particular point.

An object of the invention is to provide a liquid feeding apparatus.

Another object of the invention is to provide a device capable of feeding selected quantities of liquid to a desired point.

Other objects of the invention will be apparent from the following description and the accompanying drawing of which Figure I is a diagrammatic, elevational view of apparatus illustrating the invention; Figure II is a horizontal cross-sectional view, along line 2—2 of Figure I, of adjusting mechanism forming part of the apparatus.

In the treatment of water with chemicals, it is necessary to adjust the quantity of chemical fed to the stream of water from time to time depending on the nature of the water and the amount of water pumped through the line. It is also desirable to treat water with different chemicals from time to time. My invention is designed to enable proportioning of various liquid chemicals or solutions in a simple manner.

Although my invention is designed particularly for use in treating water and will be described in that connection, it should be understood that the invention is useful in feeding any liquid from a source to a given point and for proportioning the amount of liquid to be fed into a stream of any other liquid.

Referring to the drawing, the numeral 1 indicates a tank used as a source of the liquid or solution which it is desired to feed to a stream of water. The liquid in tank 1 may be an aqueous sodium carbonate solution, aqueous sodium silicate solution, a suspension of lime in water or any other liquid chemical which can be pumped.

Liquid is withdrawn from the bottom of tank 1 through line 3 by means of pump 5 and pumped through line 7 either to a perforated distributing head 9 in feed box 11 or through line 13 and distributor pipes 15, back to the bottom of tank 1. The amount of liquid which is fed to feed box 11 and recirculated to tank 1 is controlled by the valves 17 and 19. A sufficient amount of liquid is fed to feed box 11 to keep a constant liquid level, therein maintained by overflow pipe 21, which empties into the upper portion of tank 1. The rate at which liquid is pumped from the bottom of tank 1 should be at least sufficient to maintain a constant level in feed box 11 and preferably in excess of that amount in order to provide recirculation to tank 1 and agitation of the solution or suspension in the tank. Recirculation is particularly necessary when using lime or other suspension in order to prevent settling of the lime to the bottom of the tank. Liquid flows by gravity from feed box 11 through line 23 connected to the feed box adjacent to the bottom thereof through flexible coupling 25 and nipple 27 into a Siamese funnel 29. Flexible coupling 25 joins the pipe 23 to the nipple 27 and may be made out of ordinary rubber hose or other suitable flexible material which is non-permeable to liquid. The lower end of nipple 27 extends a short distance below the top of the Siamese funnel 29 and is located along the center line thereof.

The Siamese funnel 29, as illustrated, is cylindrical in shape with a round bottom and has a solid vertical partition 31 extending across the center thereof directly below the lower end of nipple 27. The solid partition 31 has an upper knife edge 33 immediately below the lower end of nipple 27 with only sufficient clearance to enable the lower end of the nipple to be moved in a lateral direction. The nipple 27 may be made from ordinary cylindrical pipe or the end thereof may be partially flattened and elongated in a direction at right angles to the partition in order to enable a more effective division of the stream of liquid, issuing from the nipple, by the knife edge 33.

Two upwardly extending ears 35 are fastened to the outer wall of the funnel 29, opposite each other adjacent the upper end of the funnel, by welding or any other suitable manner. The ears 35 have unthreaded openings through which the non-threaded portions 37 and 39 of rod 41 pass. The portion 43 of rod 41 between ears 35 is threaded and of slightly greater diameter than the unthreaded end portions and the holes in ears 35. The threaded portion 43 passes through a threaded opening in lug 45 welded to nipple 27. A knurled hand wheel or knob 47 is fastened to each end of rod 41.

A return line 49 connects the right hand compartment 51 of the Siamese funnel 29 with the tank 1 so that liquid falling into the right hand side of the funnel will return to the upper portion of tank 1. A feed pipe 53 connects the bottom of the left hand compartment 55 of the Siamese funnel 29 to the point to which the liquid is to be fed.

Since a constant head of liquid is maintained in feed box 11, and the line from the feed box to the Siamese funnel is free of any obstruction, the rate of flow of liquid from feed box 11 to the Siamese funnel will be constant. As the liquid leaves the end of nipple 27, it is split or divided into two portions by the knife edge 33 of separator 31. The amount of liquid which flows into each of the two compartments of the Siamese funnel will depend on the position of the lower end of nipple 27 as adjusted by the threaded rod 41. It will be apparent that the liquid may all be caused to flow into either the left hand or right hand compartments by moving the lower end of the nipple a sufficient distance to the left or right of the separator.

By means of the apparatus described, a uniform flow of chemical to a desired point can be maintained without using valves or other restrictions which would tend to plug or bridge off. Microadjustment of feeding rates can be effected.

In starting operation of the device, it is desirable either to fill the feed box to the desired level or adjust the nipple so that all the liquid will return to the supply tank until sufficient liquid has been pumped to the feed box 11 to fill it to the level of the overflow pipe 21. By closing valves 19 and opening valve 17, liquid can be pumped to the feed box 11 at a more rapid rate than it leaves through the line 23, thereby enabling the level in the feed box 11 to build up. When the level in the feed box reaches the overflow line 21, valves 17 and 19 are properly adjusted so as to feed only sufficient liquid to feed tank 11 to keep the level up to overflow line 21 and the nipple is adjusted by means of an adjusting screw to feed the proper proportion of the solution to the two compartments.

Although I have shown a threaded rod, adapted to be rotated by hand, for adjusting the position of the nipple, it is apparent that the position of the nipple can be automatically changed by connecting it to a pressure responsive device which in turn is connected to the water feed line so that with the change of rate of flow of the water, the position of the nipple will change in response to the flow of water.

It is claimed:

A slurry proportioning device to continuously incorporate desired amounts of a slurry carrying suspended solids into a liquid to be treated thereby comprising a storage tank, a feed box and a funnel, means for continuously feeding slurry from said storage tank to said feed box, means for returning any desired portion of said slurry prior to entering said feed box to the lower portion of said storage tank through a distributing head located in the bottom of said tank to maintain uniform distribution of suspended solids in said slurry, an overflow line connecting said feed box to said tank, a pipe connected to the lower portion of said feed box, the end of which pipe is located directly over said funnel and is movable in a horizontal direction, a fixed, vertical partition in said funnel having an upper knife edge a short distance below the end of said pipe said vertical partition dividing said funnel into two chambers, a threaded rotatable rod supported by said funnel, said rod engaging the movable end of said pipe in such manner as to cause it to move in a path across said partition upon rotation of said rod, a pipe connecting the lower portion of one chamber of said funnel to the point of disposal in said liquid to be treated and a separate pipe connecting the other chamber of said funnel to said tank.

CHARLES F. TERRELL, Jr.

REFERENCES CITED

The following references are of record in the file of this patent:

UNITED STATES PATENTS

| Number    | Name        | Date          |
|-----------|-------------|---------------|
| 1,181,726 | Bishop      | May 2, 1916   |
| 1,493,987 | Kenney      | May 13, 1924  |
| 1,612,572 | Chillas     | Dec. 28, 1926 |
| 1,621,022 | Meachin     | Mar. 15, 1927 |
| 1,687,446 | Hedgcock    | Oct. 9, 1928  |
| 1,792,757 | Parker et al. | Feb. 17, 1931 |
| 2,182,378 | Gunn        | Dec. 5, 1939  |
| 2,325,573 | Thompson    | July 27, 1943 |